United States Patent [19]

Silvey

[11] 3,977,446

[45] Aug. 31, 1976

[54] TREE FELLING METHOD

[76] Inventor: George E. Silvey, 2252 N. 5th St., Springfield, Oreg. 97477

[22] Filed: Dec. 29, 1975

[21] Appl. No.: 644,625

[52] U.S. Cl. .......................... 144/34 B; 144/34 R; 144/309 AC
[51] Int. Cl.² ........................................ A01G 23/08
[58] Field of Search............ 83/928; 144/2 N, 34 R, 144/34 B, 309 R, 309 AC, 312

[56] References Cited
UNITED STATES PATENTS 3,548,899  12/1970  Emerson .......................... 144/34 B

FOREIGN PATENTS OR APPLICATIONS 202,678  3/1966  Sweden ............................ 144/34 B Primary Examiner—Othell M. Simpson
Assistant Examiner—W. D. Bray
Attorney, Agent, or Firm—James D. Givnan, Jr.

[57] ABSTRACT

A method of tree felling resulting in rearward displacement of the tree trunk, for a portion of its length from the tree stump so as to reduce stump to tree tip distance and lessen impact of the tree with the ground. An undercut area is formed by intersecting undercuts resulting in an inclined undercut surface deflecting the sawn tree butt in a direction rearward or opposite to that of the falling direction. On the backside of the tree, undercuts are made which intersect with one another to provide inclined surfaces retaining the fallen tree trunk on the stump. A modified method includes the steps of forming an initial backcut and a secondary backcut providing a ridge therebetween canted to the tree trunk so as to discharge the trunk to one side at the final stage of falling.

5 Claims, 5 Drawing Figures

TREE FELLING METHOD

BACKGROUND OF THE INVENTION

The present invention relates to a method of felling trees and specifically to such a method for use where felling must be accomplished within a limited area.

In certain instances the felling of a tree is hindered by space limitations such as fences, cliffs, waterways, etc. which greatly complicate the tree felling operation. A further problem is the force of impact occurring when very tall trees, such as those logged in the Western states, contact the ground. Resulting splits cause the loss of many board feet.

SUMMARY OF THE PRESENT INVENTION

The method embodying the present invention concerns the formation of an undercut and backcuts so as to cause the butt portion of the tree to slide rearwardly over the tree stump surface to accomplish felling of the tree within a desired area.

In the present method, the surfaces defining the undercut are both downwardly and inwardly inclined toward the tree center with the lowermost undercut surface eventually providing a supporting surface for the tree trunk during tree felling. The backcut, while normally a cut within a single plane and substantially along the horizontal, is altered in the present method. The present backcut is inclined for the purpose of supporting a tree trunk moving therealong during felling. The backcut may also be made so as to provide a surface, inclined laterally to the tree falling direction, so as to affect lateral discharge of the trunk during the tree fall. If desired, an additional undercut may be made to provide a relieved corner of the uppermost undercut surface which facilitates initial sliding passage of the tree butt over the stump surfaces.

Important objectives of the present method of tree felling include: the provision of a tree felling method whereby the tree trunk slides rearwardly along the upper stump surface to reduce the distance from the stump to the tip of the fallen tree; the provision of a method of tree felling whereby the fallen tree may be temporarily supported, adjacent one of its ends, on the tree stump; the provision of a tree felling method greatly reducing tree impact; the provision of a tree felling method wherein all undercut surfaces are downwardly inclined toward the tree center; the provision of a tree felling method whereby the final lay of the tree may be accomplished by lateral displacement of the tree relative to its stump; the provision of a tree felling method wherein the backcut may comprise two cuts each inclined in two directions to provide cooperating surfaces to guide and retain the felled tree in place on the stump; and the provision of a tree felling method wherein the backcut is inclined so as to laterally displace the tree during its fall.

DETAILED DESCRIPTION OF THE PREFERRED EMBODIMENT

Figure 1:
FIG. 1 is a perspective view of a tree felled in accordance with the present method.

With continuing reference to the accompanying drawings wherein applied reference numerals indicate parts similarly identified in the following specification, the reference numeral 1 indicates a tree stump while reference numeral 2 indicates a fallen tree. A tree butt is indicated at 3.

Figure 2:
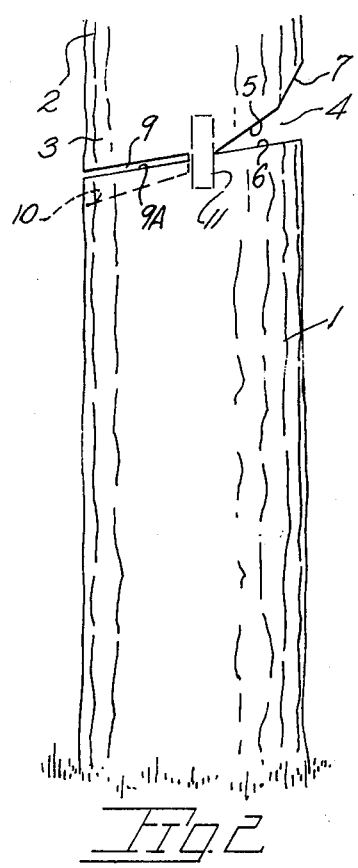
FIG. 2 is a side elevational view of the tree immediately before felling of same.
Figure 3:
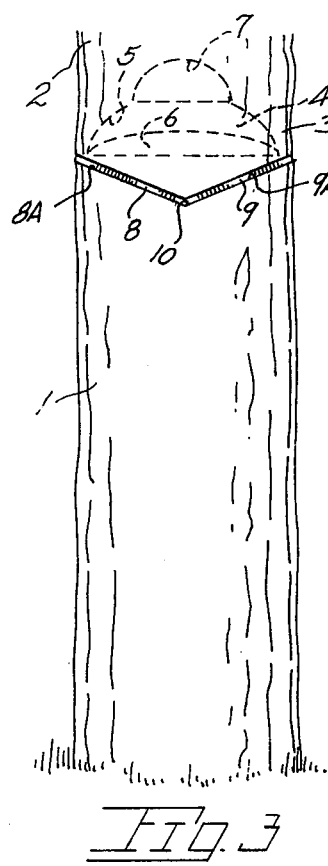
FIG. 3 is an elevational view taken from the lefthand side of FIG. 2.

With attention to FIGS. 2 and 3 an undercut area at 4 is defined by an upper undercut surface at 5 and a lower undercut surface is indicated at 6. Both of said surfaces are inclined downwardly and terminate chordally of the tree trunk. Lower surface 6 is approximately 10° from a horizontal plane however the downward inclination of same may vary to suit different situations. Desirably, the undercut is formed with the upper corner of undercut surface 5 being removed leaving a steeply inclined undercut slide surface 7 which, as later elaborated upon, facilitates rearward passage of the tree butt over the stump. During tree felling both undercut surfaces 5 and 7 come into contact with lower surface 6 for passage therealong towards the left-hand direction viewed in FIG. 2.

Figure 4:
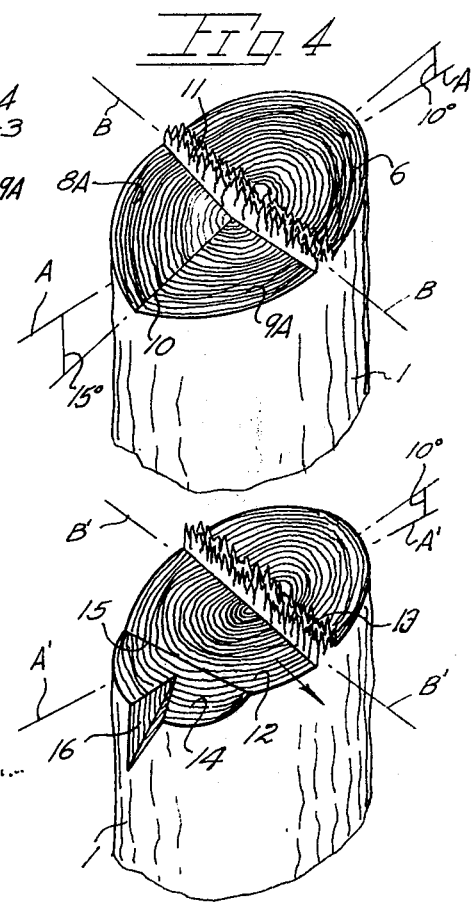
FIG. 4 is an upper perspective view of the resulting tree stump configuration.

With continuing attention to FIGS. 2 and 3, backcuts are indicated at 8 and 9 which initially extend inwardly to approximately the tree center as viewed in FIG. 2. Each of said backcuts are made so as to provide backcut surfaces 8A and 9A each inclined in two different directions, rearwardly and inwardly, merging at 10 (FIG. 3) along or adjacent a tree diameter. From the foregoing, it will be seen that the backcut results in surfaces 8A and 9A which, as viewed in FIG. 4, provide cooperating surfaces which permit guided tree trunk movement therealong while confining same on the stump. The inclination of the line of mergence 10 of the backcuts may be approximately 15 degrees from the horizontal.

Indicated at 11 is a holding wood area, which to initiate falling, is reduced by advancing one or both backcuts 8 and 9 toward undercut area 4. During such advancement, the fall commences resulting in some of the holding wood separating by both tension and compression forces. The holding wood may additionally be reduced by the sawing of a multitude of kerfs extending inwardly from the undercut surfaces as well as by additional saw kerfs directed transversely to the first mentioned kerfs which gradually impart flexibility to the holding wood to facilitate a controlled fall. The method of so reducing the holding wood is covered in a prior U.S. patent application filed by the present inventor and accorded U.S. Ser. No 618,825 and hence forms no part of the present method.

Figure 5:
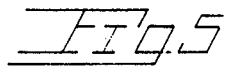
FIG. 5 is a view similar to FIG. 3 resulting from a somewhat modified method.

In FIG. 5 I show the upper surface of a tree stump resulting from a modified tree felling method. An initial undercut surface at 6' is cut in the same manner as earlier described as is the upper undercut surface on the tree butt (not shown). The initial backcut, in distinction to that earlier described, is made along a single plane providing a surface 12 which may be inclined downwardly away from a holding wood area at 13. Additionally, sawn surface 12 may also be inclined downwardly and laterally in the direction of the applied arrow.

A second backcut is subsequently made leaving a backcut surface 14 which merges inwardly and upwardly along a ridge 15 intermediate backcut surfaces 12 and 13. The backcut surfaces 11 and 13 along with ridge 15 impart lateral movement (in the direction of the applied arrow) to the tree trunk moving rearwardly thereover during falling. In instances where backcut surface 12 is horizontal, the tree trunk will be urged laterally off the stump surfaces by the canted nature of ridge 15.

As an optional step, a V-cut at 16 may be made to provide a relieved area communicating with the second backcut surface 14 for the purpose of initially retaining the tree trunk in sliding disposition over the upper tree stump surfaces seen in FIG. 5. During the latter part of the fall the tree trunk will approach the horizontal at which time the same will rise out of engagement with relieved area 16 whereupon ridge 15 and, if inclined, surface 11 will impart lateral motion to the tree trunk to discharge in the arrow indicated direction.

In the drawings, axes A, B; A', B' are perpendicular to one another and to the tree axis.

In practice of the present method, the tree faller will form undercut area 4 by downwardly inclined cuts resulting in surfaces 5 and 6. To facilitate passage of tree butt 2 over the stump surfaces a further undercut may be made resulting in slide surface 7. Typically the undercuts are transversely orientated in the direction to the intended lay of the tree. Backcuts 8 and 9 are made with separate passes of the saw with the cuts being advanced into the holding wood to initiate the fall. In the first described method, undercut surface 5 will contact surface 6 with the holding wood 11 being severed by tension and compression forces whereupon surface 5 passes therepast and rearwardly over backcut surfaces 8 and 9. The two-way inclination of surfaces 8 and 9 results in the passing tree trunk being supported for sliding movement along the stump surface with the tree trunk coming to rest in an elevated position with the tree butt coming to rest several feet rearward of the stump. The tree butt distance from the stump will be determined by the terrain and also the height at which the tree is severed. As aforesaid, such falling of the tree lessens ground impact and further may be used to avoid surface obstructions. Displacement of the tree trunk from the stump is accomplished by suitable means such as wedging or the use of a powered instrumentality.

The modified method discussed in connection with FIG. 5 is intended to initially retain the tree trunk in sliding engagement with the stump surfaces until the falling tree approaches a shallow angle with the terrain at which time supported contact of the trunk with ridge 15 will result in lateral discharge of the tree off the stump.

While I have shown and described but a few embodiments of the present invention it will be apparent to those skilled in the art that the invention may be embodied still otherwise without departing from the spirit and scope of the invention.

Having thus described the invention, what is desired to be secured under a Letters Patent is:

1. A method of felling a tree whereby the tree slides for a portion of its length along the tree stump to lessen the tree impact area, said method including the steps of,
   cutting an undercut area in the tree defined by upper and lower surfaces, said lower undercut defining surface being cut in a downwardly inclined direction toward the tree center,
   cutting backcuts along intersecting planes with each of said backcut planes inclined from the horizontal in at least two directions and intersecting along a mid-portion of the tree, and
   advancing the backcuts inwardly toward the undercut defining surfaces until the tree commences falling whereat that portion of the tree end coming into contact with the lower undercut defining surface of the tree stump will be deflected in a direction opposite to the tree falling direction so as to cause the felled tree to be partially supported by the tree stump.

2. The method of felling a tree claimed in claim 1 additionally including the step of removing a portion of the tree trunk immediately above the undercut area to provide a slide surface on the tree lower end.

3. The method of felling a tree whereby during falling the tree initially slides for a portion of its length along the tree stump and thereafter is displaced laterally away from the tree stump, said method including the steps of,
   cutting an undercut area in the tree defined by upper and lower surfaces, said lower surface being cut in a downwardly inclined direction toward the tree center,
   cutting an initial backcut along a single plane,
   cutting a secondary backcut upwardly and inwardly to intersect the first mentioned backcut, and
   advancing the backcut inwardly toward the undercut defining surfaces until the tree commences falling whereat that portion of the tree end coming into contact with the lower undercut defining surface of the tree stump will initially be deflected in a direction opposite to the tree falling direction whereafter tree trunk contact with said ridge will result in lateral movement of the tree trunk and discharge of the trunk to the side of the stump.

4. The method claimed in claim 3 additionally including the step of making a V-shaped cut within said secondary backcut for initially retaining the tree trunk on the stump during the first part of the fall.

5. The method of felling a tree claimed in claim 3 additionally including the step of removing a portion of the tree trunk immediately above the undercut area to provide a slide surface on the tree lower end.

* * * * *